United States Patent
Wang

[15] 3,701,014
[45] Oct. 24, 1972

[54] MEASURING SYSTEM EMPLOYING A SENSING LOOP AND A REFERENCE LOOP IN BUCKING RELATIONSHIP TO PROVIDE CURRENT-TO-VOLTAGE CONVERSION

[72] Inventor: Chien San Wang, 1201 Hudson, Denver, Colo. 80220

[22] Filed: Jan. 23, 1970

[21] Appl. No.: 8,758

Related U.S. Application Data

[62] Division of Ser. No. 639,534, May 18, 1967, Pat. No. 3,542,952.

[52] U.S. Cl. ................................324/98, 307/296
[51] Int. Cl. ......................................G01r 17/02
[58] Field of Search..........324/98, 99, 140, 120, 126, 324/127; 330/22, 40; 321/17; 307/296

[56] References Cited

UNITED STATES PATENTS

| | | | |
|---|---|---|---|
| 395,974 | 1/1889 | Hayes et al. | 324/98 |
| 934,596 | 9/1909 | Conrad | 324/140 X |
| 2,059,786 | 11/1936 | Gilbert | 324/99 |
| 2,762,976 | 9/1956 | Conant | 32/98 |

*Primary Examiner*—Rudolph V. Rolinec
*Assistant Examiner*—Ernest F. Karlsen
*Attorney*—Duane C. Burton

[57] ABSTRACT

This invention is a current-to-voltage conversion system. The use of the conversion system is in measuring AC or DC signals and in sound reproduction systems. The DC conversion system comprises a reference loop and a sensing loop connected in current bucking relation. A transistorized "zero junction circuit" senses the current differential between the two loops and generates an output voltage that is related to the current differential. The DC conversion system is used to sense current changes for a measuring instrument. the AC conversion system is used to sense output current flow in an audio reproduction system and to provide a feedback voltage directly related to the current flow, for example.

8 Claims, 7 Drawing Figures

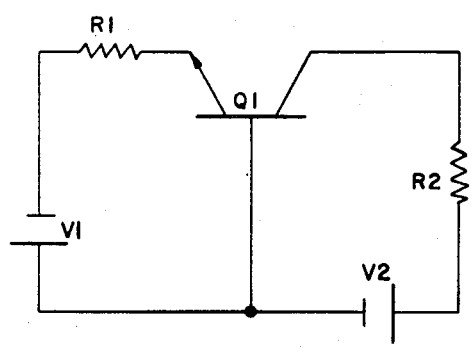
FIG.1
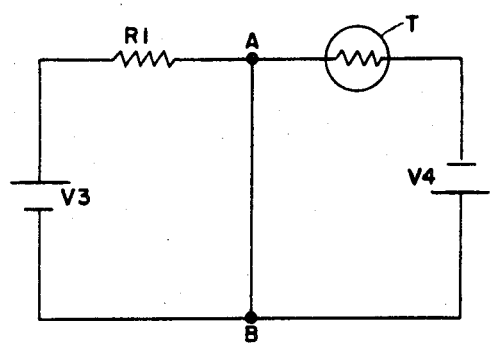
FIG.2
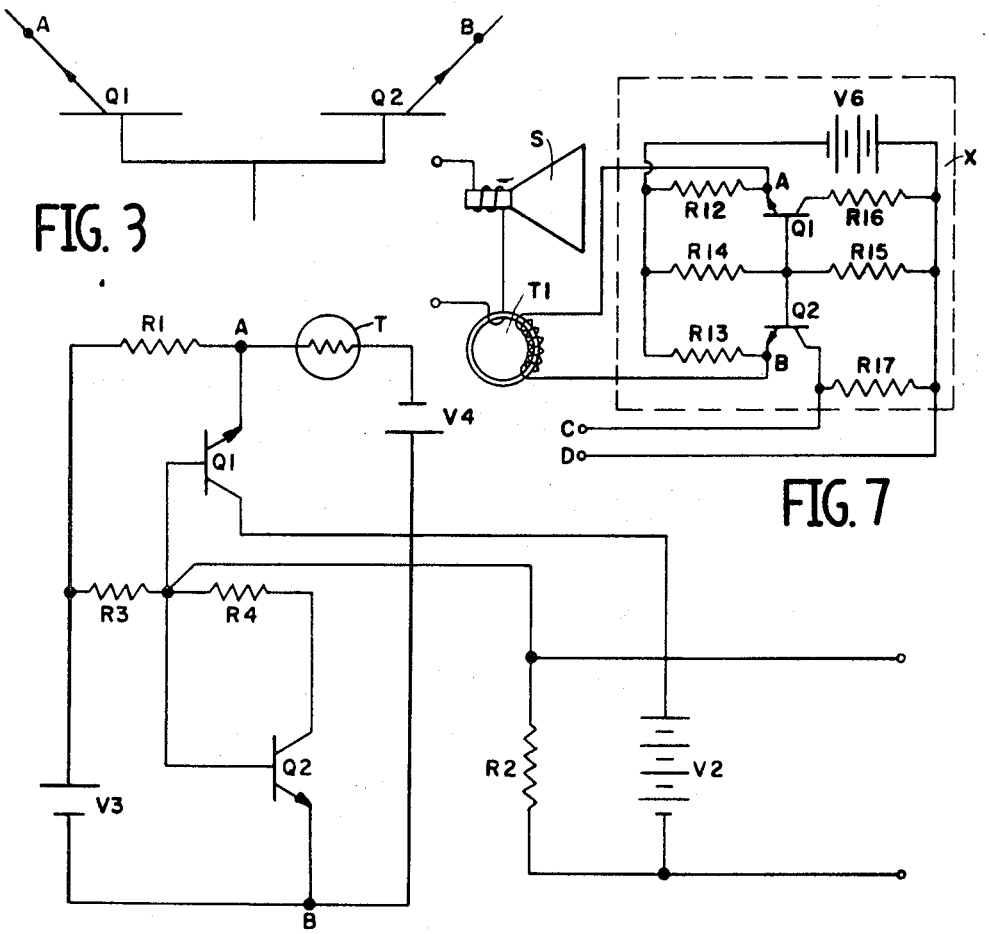
FIG.3
FIG.7
FIG.4

MEASURING SYSTEM EMPLOYING A SENSING LOOP AND A REFERENCE LOOP IN BUCKING RELATIONSHIP TO PROVIDE CURRENT-TO-VOLTAGE CONVERSION

This is a division of application Ser. No. 639,534, now U.S. Pat. No. 3,542,952 filed May 18, 1967.

BACKGROUND OF THE INVENTION

In many electronic environments it is necessary to sense current changes and convert the current changes to voltage changes, hence, current-to-voltage conversion systems have found widespread use. For example, in many temperature measuring systems a thermistor is used to sense temperature changes. The resistance of the thermistor changes with thermal changes to vary the amount of current passing through the thermistor. This current change must be amplified before it can be measured by a measuring instrument. However, most amplifying circuits are voltage amplifiers. Therefore, it is necessary to use a current-to-voltage system to convert the thermistor current changes to voltage changes. The voltage changes are then amplified and detected in a voltage measuring instrument.

While current-to-voltage conversion systems have found widespread use, their operation has not always been entirely satisfactory. Specifically, prior art current-to-voltage conversion systems have normally added additional resistance to the current side of the conversion system. The addition of resistance has decreased the sensitivity of the conversion system and increased the error in the output signal. That is, the addition of resistance will materially change the characteristics of the signal being measured. Hence, it is desirable to have a sensing system that will not introduce either voltage or resistance to the circuit being measured.

Moreover, prior art conversion systems have found it difficult to work with low level signal changes because the conversion systems have converted a steady state current plus the change in current. That is, small flucuations or changes are hard to detect when the measuring or detection device must detect a large steady state signal plus a small change.

Therefore, it is an object of this invention to provide a new and simple current-to-voltage conversion system with an inherent accuracy not achievable before with simple circuitry.

It is also the object of this invention to provide a new and improved current-to-voltage conversion system wherein the system does not add resistance or voltage to the current sensing side of the system.

It is a still further object of this invention to provide a new and improved current-to-voltage conversion system wherein small current changes are converted to large voltage changes.

It is another object of this invention to provide a new and improved measuring system including a novel current-to-voltage conversion system that converts current changes without regard to any steady state current.

With the present state of the art in sound reproduction, the only serious problem remaining for true reproduction of sound is the "distortion of the CURRENT output" from the amplifier to the speaker caused by the changing electrical impedance of the speaker (commonly used, permanent magnet moving coil cone speaker). It is well known that the electrical impedance of subject speakers will vary with such parameters as current level, frequency, motion amplitude, and the basic speaker design (permanent magnet and coil size).

Assuming a perfect voltage feedback amplifier, it is impossible to correct the distortion of the current flow caused by changing speaker impedances. Prior art amplifier systems can not sense current distortion because the output voltage signal will be the same as the input voltage signal even though radical distortion of the current flow to the speaker is occurring. However, speakers are current controlled devices and cone displacement is due to the force caused by the current. This problem of speaker induced current distortion has long been recognized, but until now there has been no adequate solution.

The desired solution is to be able to sense the current going to the speaker (without introducing any loading and distorting device into the system) and then converting this current through proper transformation to a voltage that can be used as feedback. This voltage should have the exact wave form as the current wave form with no phase shift. Hence, the amplifier would now be forced to produce a current that will be independent of impedance changes in the speaker and will be proportional to the input voltage signal. The preceding definition can properly be called a "current source amplifier." Until now, this device has never been achieved.

Therefore, it is a further object of this invention to provide a new and improved sound reproduction system that reduces distortion in the audio output caused by impedance changes in the speaker.

SUMMARY OF THE INVENTION

In accordance with a principle of the invention, a novel current-to-voltage conversion system is used for DC operation and with a slight modification for AC operation. In DC operation, a current sensing loop and a current reference loop are connected to a novel zero junction circuit. The reference current, of constant magnitude, is used to buck out most of the sensing loop current. Hence, the difference between these currents is sensed by the zero junction circuit and converted to a proportional voltage.

A zero junction circuit has two points in its circuitry where the voltage difference is insignificantly small even under changing current flow. The presence of this junction to any outside circuit connected to these two points does not affect the current flow in the outside circuitry. This device therefore provides a junction able to sense current summations of a circuit that has been connected to the zero junction points without any adverse effect on the circuit. In fact, many outside circuits can be connected to these "zero-junction" points for a total summation of all of the current flowing in all of the outside circuits. In accordance with the invention the current summations are then transferred to a voltage amplifying loop which completes the circuitry. Hence, a current-to-voltage transformation takes place without modifying the original monitored signal.

In accordance with another principle of the invention, the zero junction circuit is composed of two active elements (transistors). The first element (transistor) senses the current differential and the second element together with the first provides a zero junction; this provides a non-loading active junction with the capability of achieving current summation (algebraically). The current flow differential is sensed by the zero junction circuit to cause an identical current flow in the voltage gain loop of the first element. The current flow in this loop across a resistance provides a voltage linearly related with the current differential sensed by the zero junction circuit.

In accordance with still another principle of the invention, an amplifier is connected to the output of the current-to-voltage conversion system. This amplifier both bucks out a steady state voltage and amplifies the changing output voltage. The amplified voltage is applied to a voltage measuring instrument, controlling device, or controlled device. And, the voltage measuring instrument provides a voltage measurement of the original current changes sensed in the current sensing circuit.

In accordance with a still further principle of the invention, and with slight modification, the current-to-voltage conversion system can be used for AC operation in the audio frequency range or even higher.

In accordance with but still another principle of the invention, the current-to-voltage conversion network can be used with a loud speaker current transformed to a proper magnitude. This current is fed to the zero junction circuit and converted to a voltage of proper magnitude which is used as a feedback voltage in a high gain operational power amplifier. An inherent characteristic obtained with an amplifier having a resistive feedback network is that the feedback voltage has the same wave form and has an amplitude that is proportional to the signal voltage applied to the input of the amplifier. Hence, the current fed to the loud speaker has the same wave form and proportional amplitude as the input signal voltage applied to the amplifier.

The foregoing objects and many of the attendant advantages of this invention will become more readily appreciated as the same becomes better understood by reference to the following detailed description when taken in conjunction with the accompanying drawings wherein:

FIG. 1 is a schematic diagram of a common base transistor circuit used to explain a portion of the invention;

FIG. 2 is a schematic diagram of a current bucking reference and sensing loops used to explain a part of the invention;

FIG. 3 is a schematic diagram of two transistors used to explain the zero junction aspect of the invention;

FIG. 4 is a schematic diagram illustrating one embodiment of the invention;

FIG. 7 is a schematic diagram illustrating how the current-to-voltage conversion system of the invention is connected in a sound reproduction system.

DESCRIPTION OF THE PREFERRED EMBODIMENTS

Figure 5:
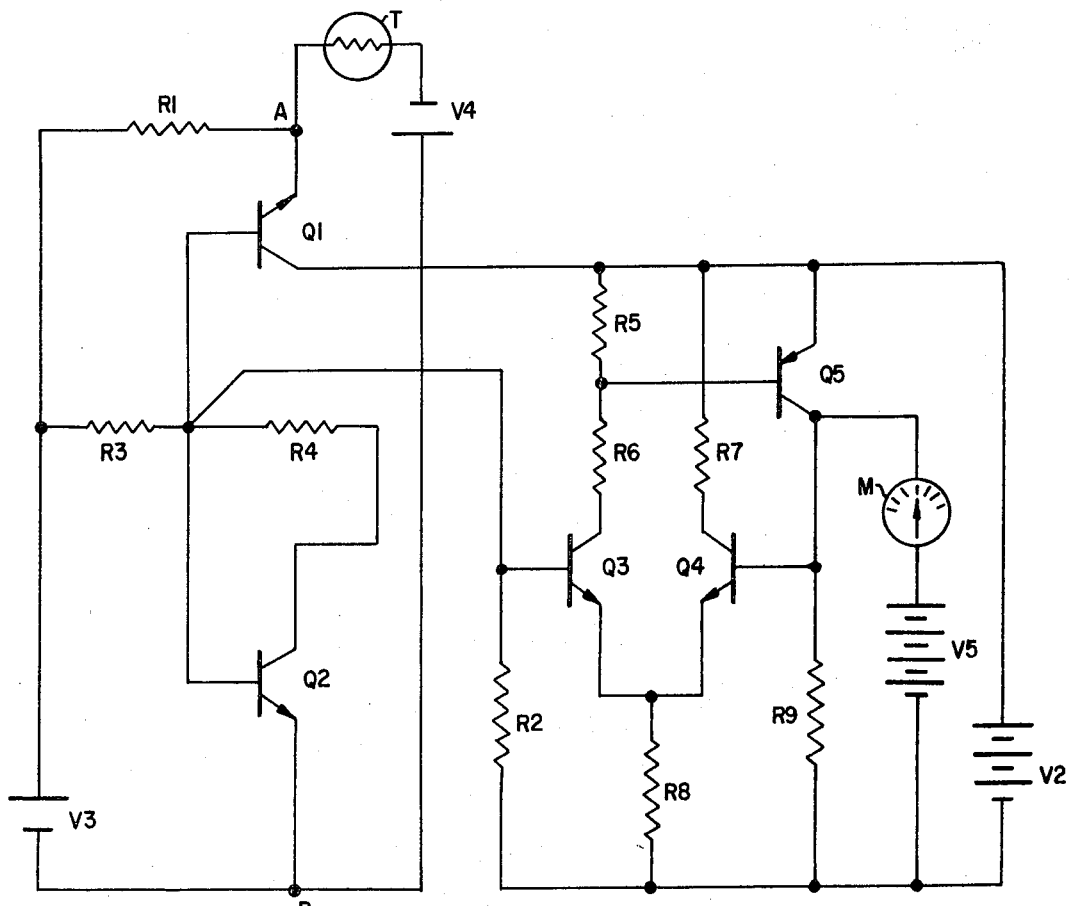
FIG. 5 is a schematic diagram illustrating a measuring system made in accordance with the invention.

Turning now to the drawings wherein like reference numerals designate like parts throughout the several views, FIG. 1 is a schematic diagram of a common base transistor circuit and comprises a first NPN (or PNP properly used) transistor Q1, an emitter resistor R1, a collector resistor R2, a first voltage source V1, and a second voltage source V2.

The emitter of Q1 is connected through R1 in series with V1 to the base of Q1 so that the emitter-base junction is forward biased. The collector of transistor Q1 is connected through R2 in series with V2 to the base of Q1 so that the collector-base junction is reverse biased.

As is well known in the transistor art, the current in the base-collector loop of a common base circuit will track the current in the base-emitter loop. That is, the current conversion factor or $\alpha$ of a common base circuit for most transistors is near unity. Hence, if the current in the base-emitter loop is made to vary the current in the base-collector loop follows it in a very near linear manner and because the current in that loop tracks the current in the emitter-base loop, the voltage drop across R2 tracks the current in the emitter-base loop. Further, by making R2 much, much larger than R1 and V2 larger than V1 a large voltage drop occurs across R2. This R2 voltage drop is then the major voltage drop in the collector-base loop. Hence, the common base circuit provides a near linear current-to-voltage conversion. Further, by making V2 and R2 large, a small change in emitter-base current causes a large change in the voltage drop across R2.

FIG. 2 is a schematic diagram of a current reference loop and a current sensing loop connected in bucking relationship. The circuit illustrated in FIG. 2 comprises a third voltage source V3, a fourth voltage source V4, a thermistor T and the emitter-base resistor R1 of FIG. 1. Resistor R1 is connected in series with the third voltage source V3 between a pair of points A and B. A wire connects points A and B so that a current reference loop is formed. Also connected across points A and B is the thermistor T in series with the fourth voltage source V4. The wire connecting points A and B is common to T and V4 so that a thermistor sensing loop is formed. The voltage sources V3 and V4 are connected so that they apply opposite polarity voltages to points A and B.

It will be appreciated by those skilled in the art that for a particular value of the thermistor's resistance the values of R1, V3 and V4 can be chosen so that the voltage across points A and B is zero. When the voltage across points A and B is zero the current flow through the wire connecting these points is also zero, i.e. a balance condition exists. Thereafter if the resistance of the thermistor T increases or decreases an unbalance condition occurs and a current flows in one direction or the other through the wire connecting points A and B. This current flow is the difference between the current flow in the reference loop comprising V3, R1, and points A and B and the current in the sensing loop comprising T, V4, and points A and B. That is, FIG. 2 illustrates a simple current bucking network wherein the current through a wire connecting points A and B is the difference between the currents in the two loops connected to those points.

It should be noted that a circuit of the type illustrated in FIG. 2 is considerably more accurate for measuring than is a single loop circuit. Specifically, if the wire connecting points A and B is removed and an ideal meter of no resistance is placed across these points, the meter is much more sensitive to fluctuations caused by variations in the resistance of the thermistor, than is the meter if placed in a loop comprising a meter, the thermistor T, and the voltage source V4. More specifically, the meter can be adjusted so that full scale deflection is caused by the fluctuating current as opposed to full scale deflection being caused by a steady state current plus the fluctuating current.

FIG. 3 is a simplified schematic diagram illustrating two transistors connected to provide zero voltage across their emitter terminals. The circuit illustrated in FIG. 3 comprises a first NPN transistor Q1 and a second NPN transistor Q2. The first transistor Q1 is illustrated as having its emitter connected to point A and the second transistor Q2 is illustrated as having its emitter connected to point B. The bases of the transistors are connected together and to a common wire. For purposes of clarity, the collectors of the transistors are not illustrated.

By connecting the common base wire to a positive voltage source and by suitably adjusting the transistor's biasing resistors (not shown) a near equal amount of current flow will pass through the transistors. Reasonable changes of current that would produce an unbalance in the base-emitter flow of Q1 and Q2, will not affect the near zero-voltage differential between points A and B.

As will be hereinafter described, this transistor network can be connected across points A and B of FIG. 2 to sense the unbalance current. More specifically, a variation in current flow through the transistors is a variation in the emitter-base current. This emitter-base current variation is sensed in a common base circuit of the type illustrated in FIG. 1. Hence, the dual transistors of FIG. 3 provide a zero junction network. Further, the common base conversion circuit in FIG. 1 provides isolation between the sensing emitter-base loop and the collector-base loop.

Turning now to FIG. 4, which illustrates the foregoing relationship; that is, FIG. 4 illustrates the systems described in FIGS. 1, 2 and 3 connected together.

The system illustrated in FIG. 4 comprises the pair of NPN transistors Q1 and Q2, the reference loop comprising resistor R1 and voltage source V3, the thermistor loop comprising thermistor T and voltage source V4, the junction between R1 and T or point A connected to the emitter of Q1, and the junction between V3 and V4 or point B connected to the emitter of Q2. The bases of Q1 and Q2 are connected together and through a third resistor R3 to the positive side of the third voltage source V3. The collector of Q1 is connected to the base of Q1 through the series circuit consisting of the second voltage source V2 and the second resistor R2. Finally, the collector of Q2 is connected to the base of Q2 through a fourth resistor R4. A pair of output terminals are connected across the voltage sensing resistor R2.

The circuit illustrated in FIG. 4 combines the operations of the circuits illustrated in FIGS. 1, 2 and 3 to provide a current-to-voltage conversion system. That is, the components of the circuit are picked so that the voltage across points A to B is near zero for any desired resistance value of the thermistor T to provide an initial or steady state condition.

While there is zero voltage across points A and B, there is current flowing through the transistors due to the bias voltages provided by the various voltage sources. The bias current through the emitter-base loop of Q1 creates a current in its collector-base loop to develop an initial or steady state voltage across the output terminals.

When the thermistor's resistance varies the current flow through the emitter-base junction of Q1 varies. As described with respect to FIG. 1, the variation in the emitter-base current flow of Q1 varies the current in Q1's collector-base circuit. This latter current variation varies the voltage drop across R2 thereby varying the voltage across output terminals. Hence, the overall system provides a current-to-voltage conversion. Further, by making V2 and R2 large a very small current fluctuation through the emitter-base circuit of Q1 provides a large voltage fluctuation across R2. That is, the circuit components can be chosen so that a micro or milliamp current change through the emitter-base circuit of Q1 provides a change across R2 measured in magnitude of several volts.

It will be appreciated by those skilled in the art and others that the output voltage of the embodiment of the invention illustrated in FIG. 4 is equal to steady state voltage E plus a voltage change $\Delta E$ caused by a change in the current flowing through the emitter base circuit of Q1. While this condition may be satisfactory in some environments it may not be satisfactory in other environments. Specifically, in some environments it may be preferable to measure only $\Delta E$ not $E + \Delta E$; this is accomplished by the circuit illustrated in FIG. 5.

The circuit illustrated in FIG. 5 comprises the circuit illustrated in FIG. 4 plus an amplifier having a voltage gain of one that bucks out the steady state voltage E.

The additional components in the circuit illustrated in FIG. 5 comprise a third NPN transistor Q3, a fourth NPN transistor Q4, a first PNP transistor Q5, a fifth resistor R5, a sixth resistor R6, a seventh resistor R7, an eighth resistor R8, a ninth resistor R9, a meter M, and a fifth voltage source V5.

Transistors Q3 and Q4 are connected in a differential amplifier arrangement. That is, the emitters of Q3 and Q4 are connected together and through the eighth resistor R8 to the negative side of the second voltage source V2. The base of Q3 is connected to the bases of Q1 and Q2 and the base of Q4 is connected to one end of the ninth resistor R9. The other end of R9 is connected to the negative side of V2. The collector of Q3 is connected through the sixth resistor R6 in series with the fifth resistor R5 to the positive side of V2 and the collector of Q4 is connected through the seventh resistor to the positive side of V2. The junction between R5 and R6 is connected to the base of Q5 and the emitter of Q5 is connected to the positive side of V2. The collector of Q5 is connected to the base of Q4 and through the meter M to the positive side of the fifth voltage source V5. The negative side of V5 is connected to the negative side of V2.

The amplifier of FIG. 5 bucks out the steady state voltage across R2 and applied only the change in voltage caused by the change in current hereinabove described to pass through the meter M. The differential amplifier formed by Q3, Q4 and Q5 provides this relationship with power gain and prevents circuit loading. That is, V5 applies a voltage that bucks out the steady state voltage at the collector of Q5 and, thus, only the actual change in voltage caused by the thermistor T change in current is applied to Q5's output and in turn applied to the meter M. Hence, the overall system provides a measuring system having a direct relationship between the current change through thermistor T and the voltage change across the meter M. This system can be designed so that zero through full-scale deflection occurs for the variations in current flow through the thermistor. The thermistor can be used to measure temperature changes in a conventional manner. Or, the thermistor can be used to sense other changes that are represented by heat changes, such as a device for measuring the efficiency of combustion by sensing the heat emitted by a chemical reaction, for example. Further, the thermistor is only by way of example, it can be replaced by other current sensing elements such as a photodecting device having a resistance that changes with the amount of light impinging on its photosensitive surface to vary the amount of current flowing through it, for example.

Figure 6:
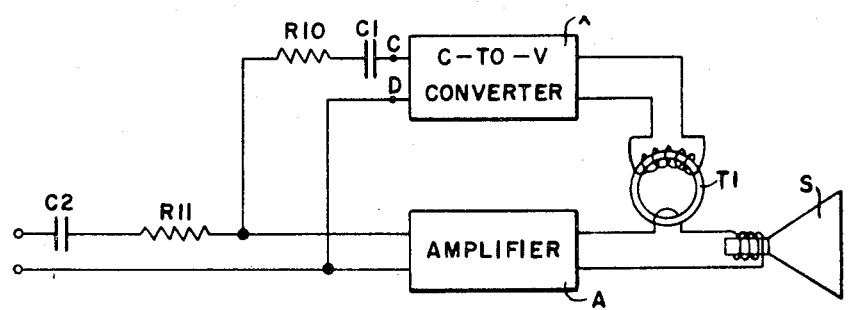
FIG. 6 is a partially schematic and partially blocked diagram illustrating a sound reproduction current compensating system made in accordance with the invention.

FIG. 6 and FIG. 7 illustrate a further embodiment of the invention wherein the current-to-voltage conversion system is used to sense the current passing through a speaker coil and generates a feedback voltage to be applied to the speaker's amplifier. The system illustrated in FIG. 6 comprises an amplifier A, a speaker S, a toroidal transformer T1, the current-to-voltage conversion system X, a first capacitor C1, a tenth resistor R10, a second capacitor C2, and an eleventh resistor R11.

The output of the amplifier A is connected to the primary winding of T1 in series with the speaker's winding. The secondary winding of T1 is connected to the input of the current-to-voltage conversion system X. The transformer takes the place of the thermistor illustrated in FIGS. 4 and 5. The output of the current-to-voltage conversion system X is connected through the tenth resistor R10 in series with the first capacitor C1 across the input of the amplifier A. A coupling network comprising C2 and R11 is illustrated as connecting a pair of input terminals to the amplifier A.

FIG. 7 illustrates that the bucking circuit has been eliminated along with the thermistor circuit and that the current transformer has been added, therefore. This current transformer transforms high current levels to small usable current levels preferably in the range of 0 to 10 ma.

The current-to-voltage conversion system X illustrated in FIG. 7 comprises the first and second NPN transistors Q1 and Q2, first, second third, fourth, fifth and sixth resistors R12, R13, R14, R15, R16 and R17, and a voltage source V6. R12 equals R13 for the preferred operation of the system. The emitter of the first transistor is connected to point A and through the first resistor R12 to the positive terminal of the voltage source V6. Similarly, the emitter of the second transistor Q2 is connected to point B and through the second resistor R13 to the positive side of V6. The third and fourth resistors R14 and R15 are connected in series across the voltage source V6 and the junction between the third and fourth resistors is connected to the bases of the first and second transistors. The fifth resistor R16 is connected between the collector of Q1 and the negative side of V6 and the sixth resistor R17 is connected between the collector of Q2 and the negative side of V6.

The secondary of the transformer is applied across the points A and B, which comprise the points of the zero junction circuitry. Hence, the transformer is electrically shorted in its output. It is well known fact that the output of a current transformer must be shorted in order to produce a near perfect current transformation of the wave form seen in the primary windings. Also, under these circumstances there is no phase shift. Hence, current must be sensed or detected with a zero junction circuit in order that the secondary will be short circuited and proper performance given. This allows a monitoring of the current flow in the same fashion as the zero junction circuit has worked in the previous explanation.

In operation, the transformer T1 senses current flow patterns in the signal applied to the speaker S. These current flow patterns are transformed by the current-to-voltage conversion system X in the manner hereinabove described to voltage patterns that duplicate proportionally the current flow patterns. These voltage flow patterns are connected through the capacitor C1 and resistor R10 to the input of the amplifier A to correct for the distortions in the current flow pattern produced by the speaker impedance changes. That is, the voltage fluctuations applied to the input of the amplifier operate to negate any distortion in the current flow pattern thereby preventing distortion in the speaker's audio output. Hence, the system improves the performance of the speaker in an audio sound system by eliminating current flow pattern distortion caused by changing speaker impedance.

The foregoing has described preferred embodiments of the invention. That is, FIG. 5 illustrates a measuring system utilizing the current-to-voltage conversion system of the invention and FIG. 6 illustrates an apparatus for improving the speaker performance of an audio system by using the current source amplifier previously described. Hence, the electrical impedance of the speaker can change in any known way without affecting the current-force relationship needed to produce high-fidelity sound. In summary, this invention eliminates impedance change as a distorting factor, something which has not been achieved in prior art sound reproduction systems.

Further, in light of the foregoing disclosure of the invention, it should be apparent to a person skilled in the art that the subject matter of this invention can be used to algebraically sum two or more AC signals without cross modulation. For example, in making a recording, a signal carrying a singer's voice can be combined with a signal carrying the orchestra all without cross modulation.

The current-to-voltage conversion system of the invention can be utilized in other measuring systems or in other types of audio sound systems. Moreover, the invention can be used with force coil operating devices in other than audio sound systems such as recording instrument systems, for example. In addition, the currentto-voltage conversion system is suitable for use in other environments where it is desired to accurately convert current-to-voltage for the purpose of measurement and control. This invention is particularly suitable in environments where the current is low but the desired voltage must be high. Because a high voltage output from a small current input is achieved by the invention, unsophisticated amplifying devices can be used to amplify the voltage changes to even higher voltages and/or power levels, if necessary. That is, many prior art current-to-voltage conversion systems change milliamp changes to millivolt changes, for example. However, this invention provides a means for changing a micro or milliamp change to full volt changes. Hence, the conversion ratio is considerably improved. Because of this direct transformation to a relatively high voltage, amplification of the output voltage can be more easily performed.

What is claimed is:

1. An electrical measuring network comprising:
 a sensing branch;
 a reference branch;
 a zero junction branch, said sensing branch, said reference branch and said zero junction branch all being connected in parallel, said zero junction branch comprising:
   i. a first circuit, including a first active circuit element, connected so as to detect the current difference between the sensing branch and the reference branch and converting said current difference into a voltage; and,
   ii. a second circuit, including a second active circuit element, for producing a voltage that is essentially equal to, but opposite in sign from, the voltage drop across said first circuit, said first and second circuits being connected together so that the combined voltage drop across said zero junction branch is essentially zero; and,
 a measuring device connected to said first circuit so as to measure said voltage.

2. An electrical measuring network as claimed in claim 1 including an amplifier connected between said first circuit and said measuring device for negating the effect of a steady state current.

3. An electrical measuring network as claimed in claim 2 wherein said first active circuit element is a first transistor of one polarity and wherein said second active circuit element is a second transistor of opposite polarity to said first transistor.

4. An electrical measuring network as claimed in claim 3 wherein said sensing branch includes a sensing element and a first voltage source and wherein said reference branch includes a first resistor and a second voltage source.

5. An electrical measuring circuit as claimed in claim 4 wherein said first resistor is connected in series with said second voltage source between the emitters of said first and second transistors and wherein said sensing element and said first voltage source are also connected in series between the emitters of said first and second transistors, said first and second voltage sources having oppositely connected poles.

6. An electrical measuring network as claimed in claim 5 including:
 a third voltage source;
 a second resistor, said second resistor being connected in series with said third voltage source between the base-collector terminals of said first transistor;
 a third resistor, said third resistor being connected between the bases of said first and second transistors and the junction between said first resistor and second voltage source; and,
 a fourth resistor, said forth resistor being connected between the base-collector terminals of second transistor.

7. An electrical measuring network as claimed in claim 6 wherein said amplifier is a difference amplifier having a reference voltage to compensate for the steady state voltage of said zero junction branch.

8. An electrical measuring circuit as claimed in claim 7 wherein said sensing means is a thermistor.

* * * * *